(12) United States Patent
Ozawa

(10) Patent No.: US 8,425,051 B2
(45) Date of Patent: Apr. 23, 2013

(54) PROJECTOR AND IMAGE PROJECTION METHOD

(75) Inventor: Takashi Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 331 days.

(21) Appl. No.: 13/013,267

(22) Filed: Jan. 25, 2011

(65) Prior Publication Data

US 2011/0181846 A1 Jul. 28, 2011

(30) Foreign Application Priority Data

Jan. 26, 2010 (JP) ................................. 2010-013934

(51) Int. Cl.
*G03B 21/14* (2006.01)

(52) U.S. Cl.
USPC .............................................. 353/70; 353/69

(58) Field of Classification Search .................... 353/69, 353/70
See application file for complete search history.

(56) References Cited

U.S. PATENT DOCUMENTS

2003/0223048 A1 12/2003 Kimura
2004/0041985 A1 3/2004 Kimura et al.
2005/0280780 A1 12/2005 Matsumoto et al.
2008/0252860 A1 10/2008 Matsumoto et al.

FOREIGN PATENT DOCUMENTS

| JP | A-2000-241874 | 9/2000 |
|----|---------------|--------|
| JP | A-2003-283963 | 10/2003 |
| JP | A-2005-159829 | 6/2005 |
| JP | A-2006-005534 | 1/2006 |
| JP | A-2007-214752 | 8/2007 |

*Primary Examiner* — Thanh Luu
*Assistant Examiner* — Renee Naphas
(74) *Attorney, Agent, or Firm* — Oliff & Berridge, PLC

(57) ABSTRACT

A projector includes: an image projection unit that projects an image; a trapezoidal correction unit that performs trapezoidal correction on the image projected by the image projection unit; a nonvolatile storage unit that stores the amount of previous trapezoidal correction and a predetermined acceptable value associated with the amount of previous trapezoidal correction, the amount of previous trapezoidal correction being used immediately before at least one of when the projector is turned off and when signal processing is changed; and an adjustment unit that sets, if the amount of previous trapezoidal correction is greater than the predetermined acceptable value, the amount of trapezoidal correction to be performed by the trapezoidal correction unit at a predetermined standard value or zero after the projector is activated or after the signal processing is changed.

8 Claims, 5 Drawing Sheets

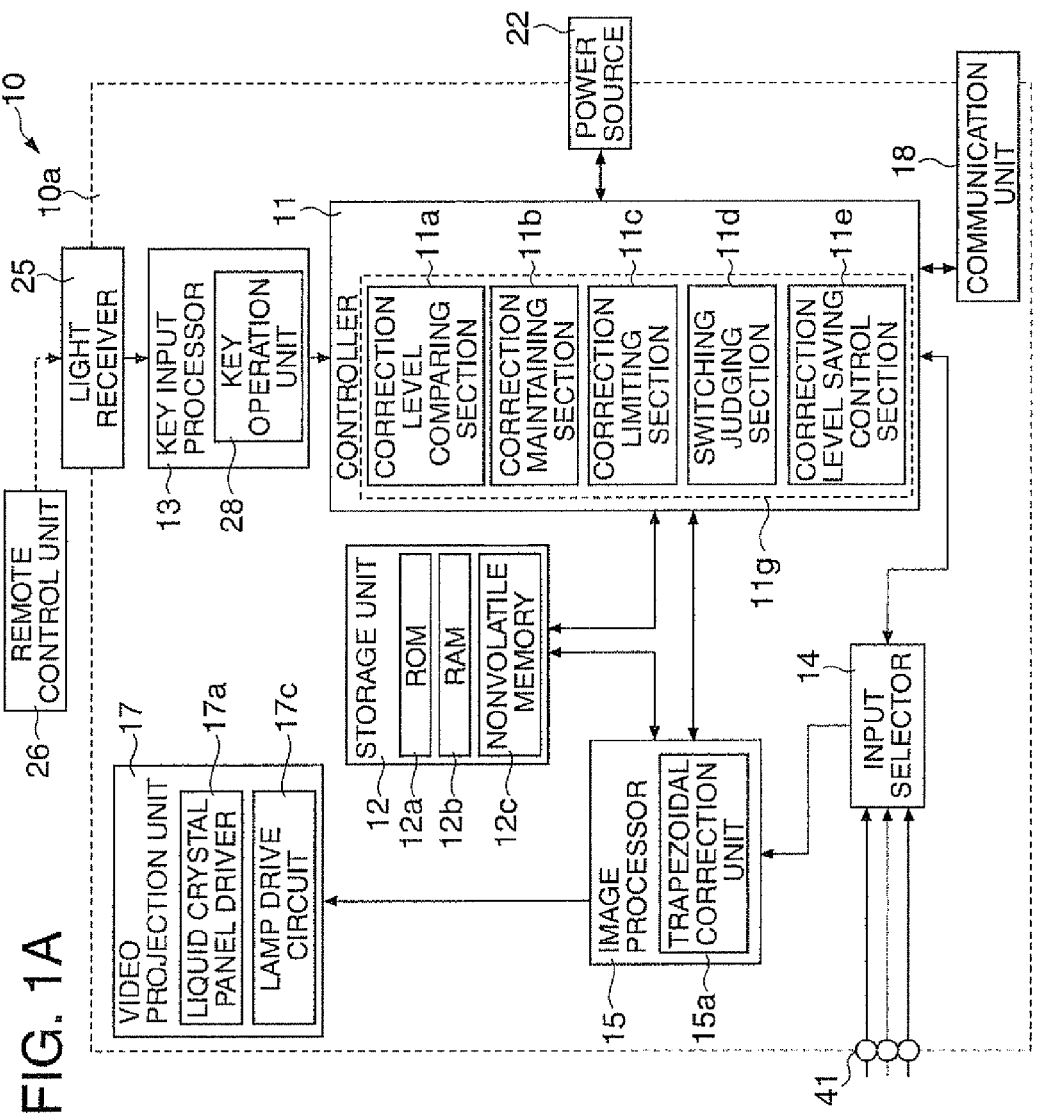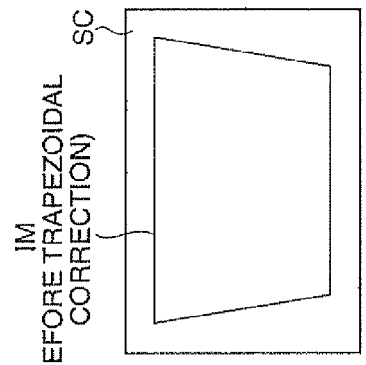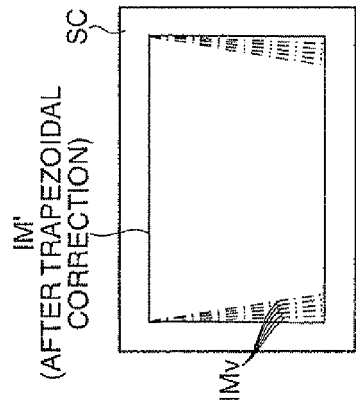

PROJECTOR AND IMAGE PROJECTION METHOD

The entire disclosure of Japanese Patent Application No. 2010-013934, filed Jan. 26, 2010 is expressly incorporated by reference herein.

BACKGROUND

1. Technical Field

The present invention relates to a projector capable of projecting an image having undergone trapezoidal correction and an image projection method executed by the projector.

2. Related Art

There has been a known projector that allows reduction in distortion of an obliquely projected image. The projector forms an image in part of an image display area on an image formation panel to correct trapezoidal distortion of a displayed image. In a manual adjustment type projector, in particular, the amount of trapezoidal distortion correction, that is, the amount trapezoidal correction, is saved when the projector is turned off, and the amount of trapezoidal correction is read when the projector is next turned on so that the same trapezoidal correction as that previously performed is performed. In a projector of this type, when a significant amount of trapezoidal correction has been performed before the projector is turned off and then the posture of the projector or any other parameter thereof is greatly changed before the projector is turned on next time, the number of operations for changing the amount of trapezoidal correction to an appropriate value increases when the projector is turned on next time, resulting in a possible cumbersome task. To improve the manual distortion adjustment function of a projector described above, there has been a technique for detecting the angle at which the projector has been installed and trapezoidal correction is automatically performed based on the angle of installation (see JP-A-2003-283963). There has been another technique for automatically correcting trapezoidal distortion by projecting and detecting a detection pattern and concurrently adjusting zooming magnification and other parameters (JP-A-2006-5534 and JP-A-2000-241874).

In the projector described in JP-A-2003-283963, however, the installation angle detector, such as an angle sensor, is required, resulting in a complicated apparatus and an increase in cost.

Similarly, in the projectors described in JP-A-2006-5534 and JP-A-2000-241874, the projection of a detection pattern and the provision of a device for detecting the detection pattern are required, resulting in a complicated apparatus and an increase in cost.

SUMMARY

An advantage of some aspects of the invention is to provide a projector that allows trapezoidal correction to be efficiently adjusted in a simple structure with increase in cost thereof suppressed and an image projection method executed by the projector.

A projector according to a first aspect of the invention includes a video projection unit that projects an image, a trapezoidal correction unit that performs trapezoidal correction on the image projected by the video projection unit, a nonvolatile storage unit that stores not only the amount of previous trapezoidal correction used immediately before at least one of the following situations: when the projector is turned off and when signal processing is changed but also a predetermined acceptable value associated with the amount of previous trapezoidal correction, and an adjustment unit that sets, when the amount of previous trapezoidal correction is greater than the predetermined acceptable value, the amount of trapezoidal correction to be performed by the trapezoidal correction unit at a predetermined standard value or zero after the projector activated or after the signal processing is changed.

According to the projector described above, when the amount of previous trapezoidal correction is greater than a predetermined acceptable value, the adjustment unit sets the amount of trapezoidal correction to be performed by the trapezoidal correction unit at a predetermined standard value or zero after the projector is activated or the signal processing is changed, whereby the number of operations for changing the amount of trapezoidal correction to an appropriate value can be reduced and hence the trapezoidal correction can be efficiently adjusted. That is, even when a significant amount of trapezoidal correction has been performed and the posture of the projector is relatively greatly changed by the time when the projector is activated next time or the signal processing is changed, adjusting the amount of trapezoidal correction in accordance with the change in the posture of the projector can be relatively simplified.

In a specific aspect of the invention, the projector described above may further include an operation unit for changing the signal processing performed by the video projection unit, and the change in the signal processing performed by the operation unit may be at least one of the following: switching of an input signal, change in an action mode, and change in an aspect ratio. The change in the signal processing described above desirably requires changing the amount of trapezoidal correction is some cases, and providing the operation unit can simplify adjustment of the trapezoidal correction in accordance with the change in the signal processing.

In another specific aspect of the invention, the predetermined acceptable value may change in accordance with the type of the input signal. The predetermined acceptable value is a reference used when it is judged whether or not the amount of previous trapezoidal correction is maintained, for example, after the projector is activated. Since the required resolution level changes, for example, depending on the type of the input signal, the predetermined acceptable value is also desirably set in accordance with the required resolution level, that is, the type of the input signal.

In another specific aspect of the invention, the adjustment unit may gradually change the amount of trapezoidal correction to be performed by the trapezoidal correction unit toward the predetermined standard value or zero in at least one of the following situations: when the projector is turned on and when the signal processing is changed. In this case, since a user can visually understand the process of changing the amount of trapezoidal correction to the predetermined standard value or zero instead of setting the amount of trapezoidal correction at the amount of previous trapezoidal correction, which corresponds to the previous state of the projector, the user can clearly understand the state of the projector. In the process changing the amount of trapezoidal correction to the predetermined standard value or zero, the user can alternatively achieve an appropriate amount of trapezoidal correction by forcibly terminating the changing process.

In another specific aspect of the invention, the adjustment unit may allow the amount of trapezoidal correction performed by the trapezoidal correction unit to be set at either of the following: the predetermined standard value and zero, when the amount of previous trapezoidal correction is greater than the predetermined acceptable value in at least one of the following situations: when the projector is turned on and when the signal processing is changed. In this case, the amount of trapezoidal correction to be performed by the trapezoidal correction unit can be quickly changed to the predetermined standard value or zero, whichever is more preferable, by using user's judgment.

In another specific aspect of the invention, the adjustment unit may allow the amount of trapezoidal correction performed by the trapezoidal correction unit to be maintained at the amount of previous trapezoidal correction when the amount of previous trapezoidal correction is greater than the predetermined acceptable value in at least one of the following situations: when the projector is turned on and when the signal processing is changed. In this case, the user can quickly respond when the posture or other situations of the projector have not changed by the time when the projector is activated next time.

In another specific aspect of the invention, the amount of trapezoidal correction to be performed by the trapezoidal correction unit may be prohibited to be set at the predetermined standard value or zero when the trapezoidal correction is lower-side trapezoidal correction in at least one of the following situations: when the projector is turned on and when the signal processing is changed. When the trapezoidal correction is lower-side trapezoidal correction, the projector is conceivably installed in a special situation. The prohibition described above is made in consideration of a possibility that forcibly canceling the trapezoidal correction may degrade the operability of the projector.

An image projection method according to a second aspect of the invention is an image projection method executed by a projector including a video projection unit that projects an image, the method including judging whether or not the amount of previous trapezoidal correction used immediately before at least one of the following situations: when the projector is turned off and when signal processing is changed is greater than a predetermined acceptable value associated with the amount of previous trapezoidal correction and setting, when the amount of previous trapezoidal correction is greater than the acceptable value, the amount of trapezoidal correction at a predetermined standard value or zero after the projector is activated or after the signal processing is changed.

According to the image projection method described above, when the amount of previous trapezoidal correction is greater than a predetermined acceptable value, the amount of trapezoidal correction is set at a predetermined standard value or zero after the projector is activated or the signal processing is changed, whereby the number of operations for changing the amount of trapezoidal correction to an appropriate value can be reduced and hence the trapezoidal correction can be efficiently adjusted.

BRIEF DESCRIPTION OF THE DRAWINGS

The invention will be described with reference to the accompanying drawings, wherein like numbers refer to like elements.

FIG. 1A is a block diagram showing the structure of a projector of a first embodiment, and FIGS. 1B and 1C describe correction of trapezoidal distortion of an image.

DESCRIPTION OF EXEMPLARY EMBODIMENTS

First Embodiment

Figure 2:
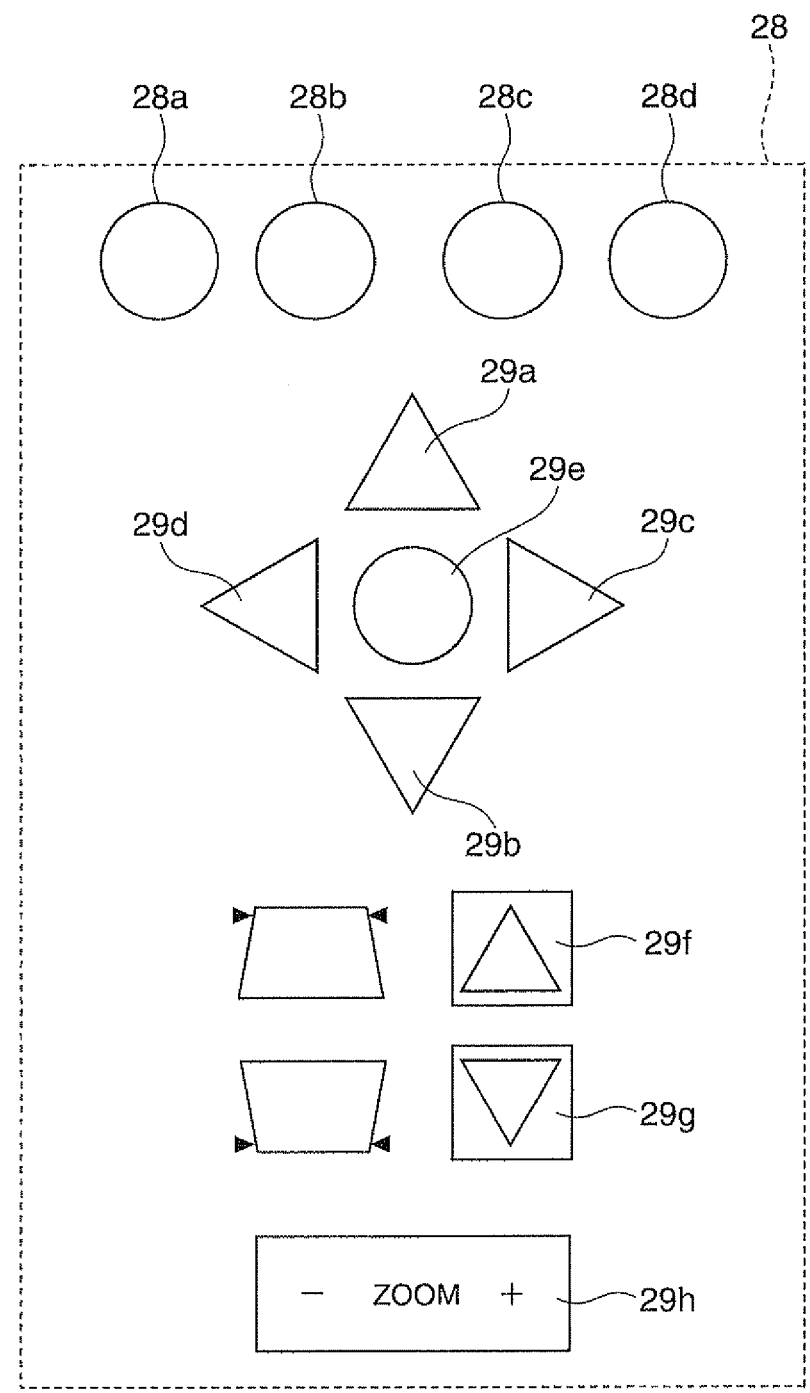
FIG. 2 shows key elements that form a key operation unit.

A projector according to a first embodiment of the invention will be described below with reference to FIGS. 1A to 1C, 2, and 3.

A. Structure of Projector

A projector 10 includes a controller 11, a storage unit 12, a key input processor 13, an input selector 14, an image processor 15, a video projection unit 17, a communication unit 18, a power source 22 in a body 10a, as shown in FIG. 1A.

The controller 11 controls the entire functionality of the projector 10. That is, the controller 11 is connected to the storage unit 12, the key input processor 13, the input selector 14, the image processor 15, the communication unit 18, the power source 22, and other components and can communicate therewith. The controller 11 acquires information from the components described above or sends control signals or other signals thereto so that the actions thereof are controlled. The controller 11 includes a correction level comparing section 11a, a correction maintaining section 11b, a correction limiting section 11c, a switching judging section 11d, and a correction level saving control section 11e as the functions of an adjustment unit 11g that particularly performs trapezoidal correction. The functions of these components will be described later in detail. An image IM projected on a screen SC by the projector 10 does not retain an original rectangular contour but is distorted into a trapezoid in some cases depending, for example, on the direction in which the projection is performed, as shown in FIG. 1B. To prevent the trapezoidal distortion, a distorted image that cancels the trapezoidal distortion is formed before projection by using image processing, that is, trapezoidal correction, whereby an image IM' projected on the screen SC has a rectangular contour, as shown in FIG. 1C.

The storage unit 12 includes a ROM 12a, a RAM 12b, and a nonvolatile memory 12c and holds a program, data, and other information necessary to operate the projector 10. In particular, the nonvolatile memory 12c is formed, for example, of an EEPROM, and data held in a rewritable manner in the nonvolatile memory 12c contains information, for example, on trapezoidal correction performed by a trapezoidal correction unit 15a in the image processor 15. The information specifically contains the amount of trapezoidal correction before the actions of the components in the projector 10 is changed (that is, the amount of previous trapezoidal correction), a predetermined acceptable value up to which the amount of previous trapezoidal correction is maintained, and other values. The nonvolatile memory 12c further contains a variety of pieces of information on signal processing, such as the type of an input signal, an action mode, and an aspect ratio, at the time in question in a rewritable manner. The type of an input signal used herein indicates which of the following signal is projected: an image signal from a computer, a video signal from a digital player, and any other signal. The action mode used herein means a variety of settings of the resolution of a projected image, a variety of projection modes prepared in corresponding with the type of the screen, and other parameters. The aspect ratio used herein means the ratio of the horizontal side to the vertical side of the screen, such as 4:3 and 16:9. The storage unit 12 further holds image data corresponding to an image to be projected by the video projecting unit 17. The image data, for example, contains a menu screen for changing the input signal and the action mode a dialog screen for inputting a user instruction. The storage unit 12 can save not only image data originally held by the projector 10 but also image data or image signals externally acquired as additional information, for example, via the communication unit 18 and the input selector 14.

The key input processor 13 is an input device or an operation unit for inputting a user instruction and includes a key operation unit 28 having a set of operation keys. A display as a user interface can be provided in association with the key input processor 13. A light receiver 25 is provided in association with the key input processor 13 and can remotely receive an instruction signal from a remote control unit 26 in a wireless manner.

The key operation unit 28 includes, as the set of operation keys, a power button 28a, an input switching button 28b, a menu button 28c, an escape button 28d, triangular buttons 29a, 29b, 29c, and 29d representing four directions, an enter button 29e, two trapezoidal correction buttons 29f and 29g, and a zoom button 29h, as shown in FIG. 2. The set of operation keys described above are arranged in an appropriate manner. The buttons 28a, 28b, 28c, 28d, 29a, 29b, 29c, 29d, 29e, 29f, 29g, and 29h, that is, the set of operation keys, can be provided not only on the key operation unit 28 but also on the remote control unit 26. The first trapezoidal correction button 29f, which is one of the two trapezoidal correction buttons 29f and 29g that are part of the key operation unit 28, causes a projected image to undergo upper-side trapezoidal correction and increases the degree of the upper-side trapezoidal correction. The first trapezoidal correction button 29f is used when the projector 10 in an upright position projects an image toward a portion above the optical axis of a projection lens and suppresses the degree of relative enlargement of an upper portion of the image (see FIG. 1B, for example). Similarly, the second trapezoidal correction button 29g causes the projected image to undergo lower-side trapezoidal correction and increases the degree of the lower-side trapezoidal correction. The second trapezoidal correction button 29g is used when the projector 10 in the upright position projects an image toward a portion under the optical axis of the projection lens and suppresses the degree of relative enlargement of a lower portion of the image.

The input selector 14 is connected to connectors 41, which are connectable to a computer, a disc player, and a plurality of other image output apparatus (not shown) simultaneously. The input selector 14, which operates under the control of the controller 11, receives an input signal (that is, an image signal) from one of the plurality of image output apparatus connected to one of the connectors 41 and outputs the signal to the image processor 15.

The image processor 15 can perform a variety of types of correction including grayscale correction, color correction, trapezoidal correction, magnification correction, and aspect ratio setting on an image signal or image data externally inputted via the input selector 14 or the communication unit 18. How the grayscale correction, color correction, trapezoidal correction, magnification correction, and other types of correction are performed can be changed under the control of the controller 11. The user can switch image processing performed by the image processor 15 and adjust the settings of the grayscale correction, color correction, trapezoidal correction, magnification correction, aspect ratio, and other types of correction as appropriate by using the key input processor 13. The image processor 15, in particular, can form an image only in part of each liquid crystal panel (trapezoidal area) of the video projecting unit 17, for example, by using the trapezoidal correction unit 15a to convert the coordinates of an image corresponding to the input signal. As a result, trapezoidal distortion of the image projected on the screen can be corrected. The degree of trapezoidal correction described above, that is, the amount of trapezoidal correction, can be adjusted, that is, increased and decreased, by operating the trapezoidal correction buttons 29f and 29g on the key operation unit 28, whereby a substantially rectangular image can be projected on the screen. Specifically, the image IM having trapezoidal distortion shown in FIG. 1B is changed to intermediate images IMv whose distortion is gradually reduced by operating the trapezoidal correction button 29f and finally corrected to the image IM' having a rectangular contour, as shown in FIG. 1C. The image processing for adjusting, that is, increasing or decreasing, the amount of trapezoidal correction is performed by changing the magnification ratio of the upper side to the lower side of the image IM. Specifically, the difference in magnification between the upper and lower sides due to the trapezoidal distortion is divided into 100 levels, and let a zero level be a state corresponding to a rectangle with no trapezoidal distortion. The length of the upper side is reduced at the maximum at the level of +50, and the length of the lower side is reduced at the maximum at the level of −50. In this case, the largest settable amount of trapezoidal correction is the level of ±50. In addition to this, the image processor 15 can produce an image signal for displaying the menu screen containing, for example, character information extracted from the storage unit 12 and other information based on an instruction from the controller 11.

The video projecting unit 17 includes a liquid crystal panel driver 17a that drives liquid crystal panels for RGB colors based on the image signal having undergone the image processing in the image processor 15 and outputted therefrom. Although not specifically described, the video projecting unit 17, which includes an optical system formed of an illuminator, the liquid crystal panels for the respective colors, a light combining prism, a projection lens, and other components, combines light fluxes having passed through liquid crystal light valves for the respective colors formed of the liquid crystal panels and projects the combined light to display a color image on the screen (not shown). A lamp drive circuit 17c that turns on a lamp as a light source in a desired manner is provided in association with the illuminator, and the lamp drive circuit 17c operates under the control of the controller 11. The optical system in the video projecting unit 17 is not limited to the one based on liquid crystal technology but may be those based on a digital micromirror device, LCOS, and a variety of other technologies. Further, the projector 10, which performs projection by using a lamp as a light source, is presented in the present embodiment, whereas the invention is alternatively applicable to a projector that performs projection by using an LED light source or a laser light source as the light source.

The communication unit 18 is an interface circuit that enables communication. The communication unit 18 can, for example, be a wireless interface circuit that enables communication in an ad hoc mode of a wireless LAN.

The power source 22 operates under the control of the control unit 11 and supplies electric power to the components in the projector 10.

B. Action of Projector

Figure 3:
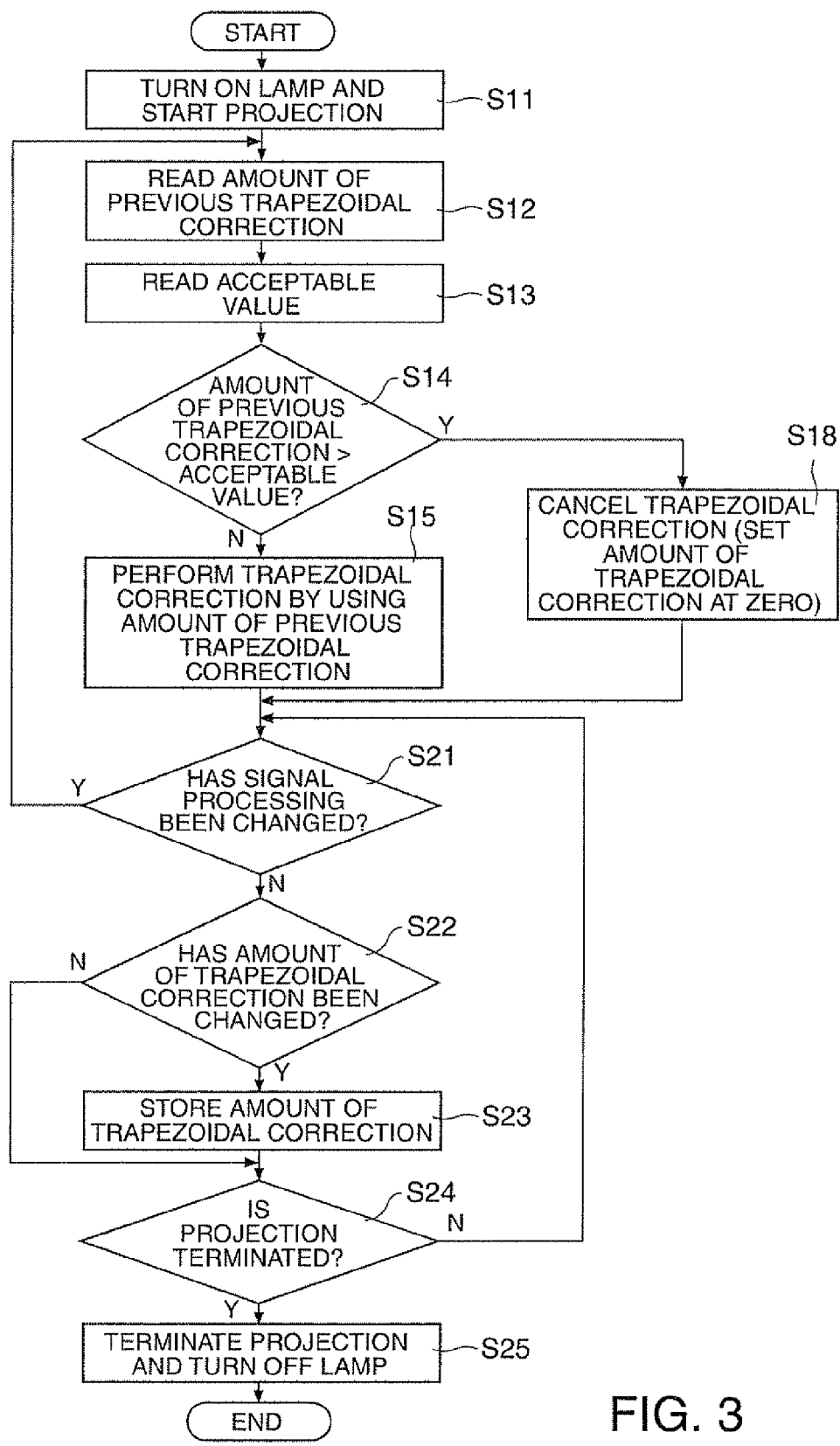
FIG. 3 is a flowchart of processes carried out in the projector of the first embodiment.

An exemplary projecting action of the projector 10 will be described below with reference to FIG. 3 and other figures. The controller 11 in the projector 10 starts the following processes when the key input processor 13 detects an instruction signal that requires startup. Specifically, when the projector 10 is projecting no image, and the user presses the power button 28a on the key operation unit 28, the projector 10 starts a display process of projecting an image.

First, the controller 11 operates the lamp drive circuit 17c in the video projecting unit 17 to execute a sequence of turning on the lamp in the illuminator and operates the image processor 15 as appropriate in response to the lamp turning-on operation to instruct the video projecting unit 17 to start image projection (step S11). At this point, the controller 11 refers to the contents in the nonvolatile memory 12c in the storage unit 12 to restore the signal processing state to that immediately before the lamp was turned off in the previous operation. Specifically, the controller 11 sets the type of the input signal, the action mode, the aspect ratio, and other parameters to those immediately before the lamp was turned off in the previous operation and instructs the video projecting unit 17 via the image processor 15 and other components to start image projection.

The controller 11, specifically the adjustment unit 11g, then reads the amount of previous trapezoidal correction from the nonvolatile memory 12c in the storage unit 12 (step S12). The amount of previous trapezoidal correction corresponds to the amount of trapezoidal correction used immediately before the projector 10 is turned off. The controller 11, specifically the adjustment unit 11g, further reads an acceptable value from the nonvolatile memory 12c in the storage unit 12 (step S13). The acceptable value is used to maintain the amount of previous trapezoidal correction and serves as a judgment reference value for resetting trapezoidal correction when the amount of previous trapezoidal correction is too large. Specifically, when the largest settable amount of trapezoidal correction is the level of ±50, the acceptable value is set, for example, at the level of ±30.

The acceptable value described above, which is written in the nonvolatile memory 12c in the storage unit 12, is not necessarily a single value but, for example, a plurality of acceptable values can be prepared and a relevant one is used in accordance with the type of the input signal. Specifically, when the input signal is provided from a computer, a relatively small acceptable value is selected, whereas when the input signal is provided from a disc player, a relatively large acceptable value is selected. The reason for this is that an image signal from a computer is desirably projected at high resolution at the sacrifice of distortion to some extent, whereas an image signal from a disc player is desirably projected with small distortion at the sacrifice of resolution to some extent. In an actual action, the controller 11, specifically the adjustment unit 11g, monitors the type of the input signal and refers to an acceptable value table stored in the nonvolatile memory 12c. When a plurality of acceptable values is present, an acceptable value according to the type of the current input signal is read.

The controller 11, specifically the correction level comparing section 11a in the adjustment unit 11g, then compares the amount of previous trapezoidal correction obtained in step S12 with the acceptable value obtained in step S13 and judges whether or not the amount of previous trapezoidal correction is greater than the acceptable value (step S14). When the amount of previous trapezoidal correction is not greater than the acceptable value (step S14: N), it is conceivable that maintaining the previous trapezoidal correction state unlikely leads to cumbersome correction of the amount of trapezoidal correction, and the controller 11, specifically the correction maintaining section 11b in the adjustment unit 11g, outputs an instruction to the image processor 15 and instructs the trapezoidal correction unit 15a to perform trapezoidal correction by using the amount of previous trapezoidal correction (step S15). On the other hand, when the amount of previous trapezoidal correction is greater than the acceptable value (step S14: Y), it is conceivable that maintaining the previous trapezoidal correction state likely leads to cumbersome correction of the excessive amount of trapezoidal correction, and the controller 11, specifically the correction limiting section 11c in the adjustment unit 11g, outputs an instruction to the image processor 15 and cancels or resets the trapezoidal correction to be performed by the trapezoidal correction unit 15a (step S18). That is, the trapezoidal correction to be performed by the image processor 15 is reset, and the amount of trapezoidal correction is set at zero.

When the amount of trapezoidal correction to be performed by the image processor 15 is set at zero, the user can choose either one of the following: the user leaves the amount of trapezoidal correction at zero or the user operates the trapezoidal correction button 29f or 29g on the key operation unit 28 to increase or decrease the amount of trapezoidal correction so that the trapezoidal correction is performed at an appropriate level.

The controller 11, specifically the switching judging section 11d in the adjustment unit 11g, then judges whether or not the signal processing has been changed (step S21). Change in signal processing means any of the following: The input signal has been switched; the action mode has been changed; and the aspect ratio has been changed. Specifically, the switching judging section 11d judges that the signal processing has been changed when the user selects another input signal through the input selector 14, for example, switches image projection between that using an image signal from a computer as the input signal and that using a video signal from a digital player as the input signal, for example, by operating the input switching button 28b in the key input processor 13. The switching judging section 11d also judges that the signal processing has been changed, the action mode has been changed in this case, when the user adjusts how the video projecting unit 17 operates, that is, increases or decreases the resolution of a projected image, for example, by operating the menu button 28c, the escape button 28d, the triangular button 29a, 29b, 29c, or 29d, or the enter button 29e. The switching judging section 11d also judges that the signal processing has been changed when the user adjusts how the video projecting unit 17 operates, that is, changes the aspect ratio, for example, by operating the menu button 28c. In the above description, change in two-way signal processing is detected. The switching judging section 11d can alternatively judge that the signal processing has been changed, for example, only when higher resolution is desirable. Specifically, the switching judging section 11d can judge that the signal processing has been changed only when the input signal has been switched from a computer to a digital player, the resolution of a projected image has been increased, or the aspect ratio has been increased.

When the signal processing has been changed (step S21: Y), the control returns to step S12, and the controller 11 thereafter carries out the processes in steps S13 and S14, and S15 or S18. That is, when the amount of previous trapezoidal correction used before the input signal is changed is greater than the acceptable value, the trapezoidal correction to be performed by the image processor 15 is terminated or canceled, whereas when the amount of previous trapezoidal correction used before the input signal is changed is not greater than the acceptable value, the image processor 15 maintains the trapezoidal correction using the amount of previous trapezoidal correction.

On the other hand, when the signal processing has not been changed (step S21: N), the controller 11, specifically the adjustment unit 11g, judges whether or not the user has changed the amount of trapezoidal correction to be performed by the trapezoidal correction unit 15a by operating the trapezoidal correction button 29f or 29g in the key input processor 13 (step S22). When the amount of trapezoidal correction has been changed (step S22: Y), the controller 11, specifically the correction level saving control section 11e in the adjustment unit 11g, stores the changed amount of trapezoidal correction in the RAM 12b, which is a memory (step S23).

When the amount of trapezoidal correction has not been changed (step S22: N), or after the changed amount of trapezoidal correction is stored in the RAM 12b (step S23), the controller 11 checks whether or not the user has operated the power button 28a in the key input processor 13 and judges whether or not the user has issued an instruction to terminate the projection. When the user has not issued an instruction to terminate the projection, the control returns to step S21 and the controller 11 thereafter carries out the processes in the steps S22 to S24. On the other hand, when the user has issued an instruction to terminate the projection, the controller 11, specifically the adjustment unit 11g, stores the current signal processing state in the nonvolatile memory 12c in the storage unit 12, instructs the image processor 15 to stop operating, and instructs the lamp drive circuit 17c in the video projecting unit 17 to stop operating so that the lamp is turned off (step S25).

As clearly shown in the above description, according to the projector 10 of the present embodiment, when the correction level comparing section 11a in the controller 11 judges that the amount of previous trapezoidal correction is greater than a predetermined acceptable value, the correction limiting section 11c in the controller 11 sets the amount of trapezoidal correction to be performed by the trapezoidal correction unit at zero after the projector is activated or the signal processing is changed, whereby the number of operations for changing the amount of trapezoidal correction to an appropriate value can be reduced and hence the trapezoidal correction can be efficiently adjusted. That is, even when a significant amount of trapezoidal correction has been performed and the posture of the projector 10 is relatively greatly changed by the time when the projector is activated next time or the signal processing is changed, adjusting the amount of trapezoidal correction in accordance with the change the posture of the projector 10 can be simplified.

In the first embodiment described above, when the amount of previous trapezoidal correction is greater than the acceptable value (step S14: Y), the amount of trapezoidal correction to be performed by the image processor 15 is set as zero. The amount of trapezoidal correction to be performed by the image processor 15 can alternatively be set at a predetermined limit. The limit is a target at which the trapezoidal correction is canceled before performed to the maximum degree. Specifically, when the largest settable amount of trapezoidal correction is the level of ±50, the limit is set at a value, for example, ranging from the level of ±10 to 20.

Further, in the first embodiment described above, it is judged whether or not the amount of previous trapezoidal correction is greater than an acceptable value both after the projector is activated and after the signal processing is changed. It can alternatively be judged whether or not the amount of previous trapezoidal correction is greater than an acceptable value only after the projector is activated or after the signal processing is changed.

Second Embodiment

A projector according to a second embodiment will be described below. The projector of the second embodiment is a variation of the projector of the first embodiment, and the portions that will not be particularly described are the same as those of the projector of the first embodiment.

Figure 4:
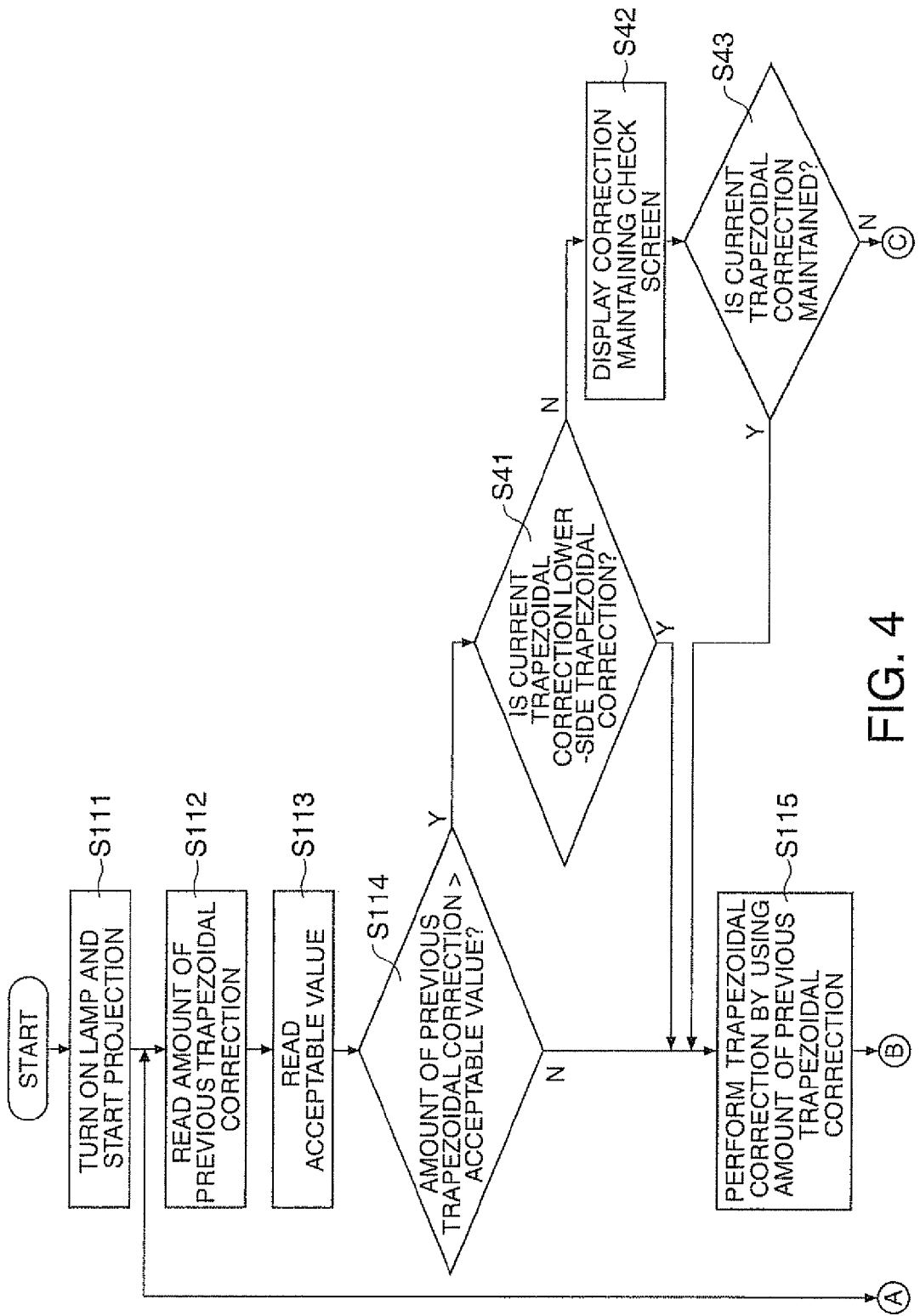
FIG. 4 is a flowchart of processes carried out in a projector of a second embodiment.
Figure 5:
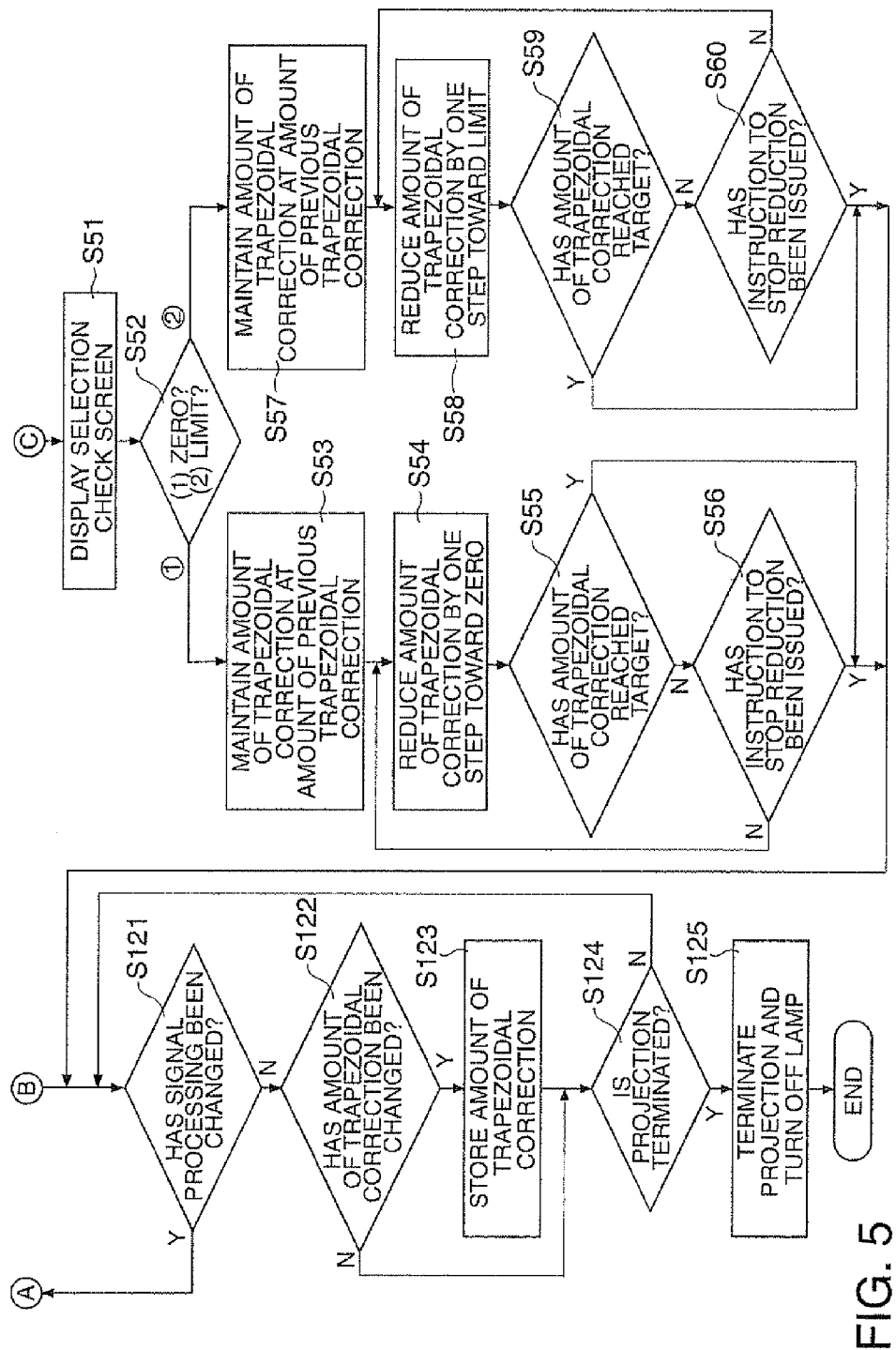
FIG. 5 is a flowchart of processes carried out in the projector of the second embodiment.

The action of the projector according to the second embodiment will be described with reference to FIGS. 4 and 5. The controller 11 in the projector 10 first executes a sequence of turning on the lamp and operates the image processor 15 to instruct the video projecting unit 17 to start image projection (step S111). The controller 11, specifically the adjustment unit 11g, reads the amount of previous trapezoidal correction from the storage unit 12 (step S112) and then reads an acceptable value from the storage unit 12 (step S113). The controller 11, specifically the adjustment unit 11g, then compares the amount of previous trapezoidal correction obtained in step S112 with the acceptable value obtained in step S113 and judges whether or not the amount of previous trapezoidal correction is greater than the acceptable value (step S114). When the amount of previous trapezoidal correction is not greater than the acceptable value (step S114: N), the controller 11, specifically the adjustment unit 11g, instructs the trapezoidal correction unit 15a in the image processor 15 to perform trapezoidal correction by using the amount of previous trapezoidal correction (step S115). On the other hand, when the amount of previous trapezoidal correction is greater than the acceptable value (step S114: Y), the controller 11, specifically the adjustment unit 11g, judges whether or not the current trapezoidal correction to be performed by the trapezoidal correction unit 15a in the image processor 15 is lower-side trapezoidal correction (step S41). The lower-side trapezoidal correction means that each of the liquid crystal panels in the video projecting unit 17 forms an image the portion of which projected in a lower portion of the screen is reduced in size.

When the current trapezoidal correction is the lower-side trapezoidal correction (step S41: Y), the controller 11, specifically the adjustment unit 11g, maintains the trapezoidal correction to be performed by the trapezoidal correction unit 15a in the image processor 15 at the amount of previous trapezoidal correction (step S115) in consideration of a special situation in which the projector 10 has been installed. That is, the trapezoidal correction unit 15 is prohibited to set the amount of trapezoidal correction at zero or a predetermine limit. The following processes are the same as those in the first embodiment, and the controller 11 judges whether or not the signal processing has been changed (step S121). When the signal processing has been changed (step S121: Y), the control returns to step S112, and the controller 11 thereafter carries out the processes in steps S113, S114, and S115 and other steps. When the signal processing has not been changed (step S121: N), the controller 11 judges whether or not the amount of trapezoidal correction to be performed by the trapezoidal correction unit 15a has been changed (step S122). When the amount of trapezoidal correction has been changed (step S122: Y), the controller 11, specifically the correction level saving control section 11e in the adjustment unit 11g, stores the changed amount of trapezoidal correction in the RAM 12b (step S123). On the other hand, when the amount of trapezoidal correction has not been changed (step S122: N), or after the changed amount of trapezoidal correction is stored in the RAM 12b (step S123), the controller 11 judges whether or not the user has issued an instruction to terminate the projection. When the user has not issued an instruction to terminate the projection, the control returns to step S121 and the controller 11 thereafter carries out the processes in the steps S122 to S124. On the other hand, when the user has issued an instruction to terminate the projection, the controller 11, specifically the adjustment unit 11g, instructs the image processor 15 to stop operating and turns off the lamp (step S125).

When the current trapezoidal correction is not the lower-side trapezoidal correction but upper-side trapezoidal correction in step S41, the controller 11, specifically the adjustment unit 11g, refers to the contents in the storage unit 12, reads image data, and instructs the video projecting unit 17 via the image processor 15 and other components to project a correction maintaining check screen (a kind of warning screen) in which the user checks whether or not to maintain the current trapezoidal correction (step S42). The user uses the triangular buttons 29a, 29b, or other buttons of the key operation unit 28 provided in the key input processor 13 to determine whether or not to maintain the current correction.

When the user determines not to maintain the current trapezoidal correction (step S43: N), the controller 11, specifically the adjustment unit 11g, refers to the contents in storage unit 12, reads image data, and instructs the video projecting unit 17 via the image processor 15 and other components to project a selection check screen in which the user sets the amount of trapezoidal correction at zero or a predetermined limit (step S51). The user uses the triangular buttons 29c, 29d or other buttons on the key operation unit 28 provided in the key input processor 13 to determine whether or not to maintain the current correction. When the user determines to maintain the current trapezoidal correction (step S43: Y), the control proceeds to step S115, and the controller 11 thereafter carries out the processes in steps S121 to S124. That is, the amount of trapezoidal correction to be performed by the trapezoidal correction unit 15a is maintained at the amount of previous trapezoidal correction.

When the user determines to set the amount of trapezoidal correction at zero (step S52: (1)), the controller 11, specifically the adjustment unit 11g, controls the trapezoidal correction unit 15a in the image processor 15 to temporarily maintain the amount of trapezoidal correction to be performed by the trapezoidal correction unit 15a at the amount of previous trapezoidal correction, which is the amount of trapezoidal correction used in the previous trapezoidal correction (step S53). The controller 11, specifically the adjustment unit 11g, then reduces the amount of trapezoidal correction to be performed by the trapezoidal correction unit 15a by one step toward zero in a predetermined period (step S54). The controller 11, specifically the adjustment unit 11g, checks the amount of trapezoidal correction obtained as a result of the reduction in step S54 and judges whether or not the reduced amount of trapezoidal correction reaches zero, which is the target (step S55).

When the amount of trapezoidal correction has not reached zero, which is the target (step S55: N), the controller 11, specifically the adjustment unit 11g, judges whether or not the user has used the key operation unit 28 provided in the key input processor 13 to issue an instruction to stop reducing the amount of correction (step S56). When no instruction to stop reducing the amount of correction has been issued (step S56: N), the control returns to step S54 and the amount of trapezoidal correction to be performed by the trapezoidal correction unit 15a is reduced again by one step toward zero. The action described above can gradually reduce the amount of trapezoidal correction toward zero. As described above, gradually reducing the amount of trapezoidal correction allows the user to check visually the change in trapezoidal correction.

On the other hand, when the amount of trapezoidal correction has reached zero, which is the target (step S55: Y), or the user issues an instruction to stop reducing the amount of correction (step S56: Y), the control returns to step S121 and the controller 11 thereafter carries out the processes in steps S122 to S125 and other processes.

When the user determines to set the amount of trapezoidal correction at a predetermined limit (step S52: (2)), the controller 11, specifically the adjustment unit 11g, controls the trapezoidal correction unit 15a in the image processor 15 to temporarily maintain the amount of trapezoidal correction to be performed by the trapezoidal correction unit 15a at the amount of previous trapezoidal correction, which is the amount of trapezoidal correction used in the previous trapezoidal correction (step S57). The controller 11, specifically the adjustment unit 11g, then reduces the amount of trapezoidal correction to be performed by the trapezoidal correction unit 15a by one step toward the limit in a predetermined period (step S58). The controller 11, specifically the adjustment unit 11g, checks the amount of trapezoidal correction obtained as a result of the reduction in step S58 and judges whether or not the reduced amount of trapezoidal correction reaches the limit (step S59). The limit is a target at which the trapezoidal correction is canceled before performed to the maximum degree. Specifically, when the largest settable amount of trapezoidal correction is the level of ±50, and the acceptable value is, for example, the level of ±30, the limit is set at, for example, the level of ±20, which is smaller than the acceptable value.

When the amount of trapezoidal correction has not reached the limit, which is the target (step S59: N), the controller 11, specifically the adjustment unit 11g, judges whether or not the user has used the key operation unit 28 provided in the key input processor 13 to issue an instruction to stop reducing the amount of correction (step S60). When no instruction to stop reducing the amount of correction has not been issued (step S60: N), the control returns to step S58 and the amount of trapezoidal correction to be performed by the trapezoidal correction unit 15a is reduced again by one step toward the limit, which is the target. The action described above can gradually reduce the amount of trapezoidal correction toward the limit, which is the target. As described above, gradually reducing the amount of trapezoidal correction allows the user to check visually the change in trapezoidal correction.

On the other hand, when the amount of trapezoidal correction has reached the limit, which is the target (step S59: Y), or the user has issued an instruction to stop reducing the amount of correction (step S60: Y), the control returns to step S121 and the controller 11 thereafter carries out the processes in steps S122 to S125 and other processes.

In the second embodiment described above, it is judged whether or not the amount of previous trapezoidal correction is greater than an acceptable value both after the projector is activated and after the signal processing is changed. It can alternatively be judged whether or not the amount of previous trapezoidal correction is greater than an acceptable value only after the projector is activated or after the signal processing is changed.

Variations and Others

The invention has been described with reference to the above embodiments, but the invention is not limited thereto. The invention can alternatively be implemented in a variety of aspects to the extent that they do not depart from the substance of the invention. For example, the following variations can be employed.

In the embodiments described above, the largest settable amount of trapezoidal correction is the level of ±50, the acceptable value is, for example, set at the level of ±30, and the limit is, for example, set at the level of ±20, but these values are presented only by way of example and can be set as appropriate in an arbitrary setting range. For example, the user can display the menu screen for changing the settings by operating the menu button 28c on the key operation unit 28 and instruct the controller 11 to change, that is, increase or decrease, the acceptable value and the limit by operating the triangular buttons 29a, 29b, 29c, and 29d, the enter button 29e, and other buttons so that the contents in the nonvolatile memory 12c is rewritten.

Further, in the embodiments described above, the trapezoidal correction unit 15a in the image processor 15 can perform the upper-side and lower-side trapezoidal correction. The trapezoidal correction unit 15a can also perform right-side and left-side trapezoidal correction. In this case, acceptable values are prepared not only for the upper-side and lower-side trapezoidal correction but also for the right-side and left-side trapezoidal correction in advance. When it is judged that the amount of previous trapezoidal correction is greater than a predetermined acceptable value after the projector is activated or after the signal processing is changed, the amount of trapezoidal correction to be performed by the trapezoidal correction unit 15a can be set at zero.

In the second embodiment described above, the amount of trapezoidal correction is changed step by step in steps S53 to S56 or S57 to S60 and finally set at a target value, but the invention is not necessarily implemented this way. The user can alternatively operate relevant keys to set the amount of trapezoidal correction directly at a target value. In this case, the amount of trapezoidal correction can be quickly changed to a desired value.

The key operation unit 28 is not necessarily provided in the body 10a but can be provided only on the remote control unit 26.

What is claimed is:

1. A projector comprising:
    an image projection unit that projects an image;
    a trapezoidal correction unit that performs trapezoidal correction on the image projected by the image projection unit;
    a nonvolatile storage unit that stores the amount of previous trapezoidal correction and a predetermined acceptable value associated with the amount of previous trapezoidal correction, the amount of previous trapezoidal correction being used immediately before at least one of when the projector is turned off and when signal processing is changed; and
    an adjustment unit that sets, if the amount of previous trapezoidal correction is greater than the predetermined acceptable value, the amount of trapezoidal correction to be performed by the trapezoidal correction unit at a predetermined standard value or zero after the projector is activated or after the signal processing is changed.

2. The projector according to claim 1,
    further comprising an operation unit for changing the signal processing performed by the image projection unit, wherein the change in the signal processing performed by the operation unit is at least one of the following: switching of an input signal, change in an action mode, and change in an aspect ratio.

3. The projector according to claim 1,
    wherein the predetermined acceptable value changes in accordance with the type of the input signal.

4. The projector according to claim 1,
    wherein the adjustment unit gradually changes the amount of trapezoidal correction to be performed by the trapezoidal correction unit toward the predetermined standard value or zero in at least one of when the projector is turned on and when the signal processing is changed.

5. The projector according to claim 1,
    wherein the adjustment unit allows the amount of trapezoidal correction performed by the trapezoidal correction unit to be set at either the predetermined standard value or zero, if the amount of previous trapezoidal correction is greater than the predetermined acceptable value in at least one of the following situations: when the projector is turned on and when the signal processing is changed.

6. The projector according to claim 1,
    wherein the adjustment unit allows the amount of trapezoidal correction performed by the trapezoidal correction unit to be maintained at the amount of previous trapezoidal correction if the amount of previous trapezoidal correction is greater than the predetermined acceptable value in at least one of the following situations: when the projector is turned on and when the signal processing is changed.

7. The projector according to claim 1,
    wherein the amount of trapezoidal correction to be performed by the trapezoidal correction unit is prohibited to be set at the predetermined standard value or zero if the trapezoidal correction is lower-side trapezoidal correction in at least one of the following situations: when the projector is turned on and when the signal processing is changed.

8. An image projection method executed by a projector including an image projection unit that projects an image, the method comprising:
    judging whether or not the amount of previous trapezoidal correction is greater than a predetermined acceptable value associated with the amount of previous trapezoidal correction, the amount of previous trapezoidal correction being used immediately before at least one of when the projector is turned off and when signal processing is changed; and
    setting, if the amount of previous trapezoidal correction is greater than the acceptable value, the amount of trapezoidal correction at a predetermined standard value or zero after the projector is activated or after the signal processing is changed.

* * * * *